(12) United States Patent
Mole

(10) Patent No.: US 10,720,827 B1
(45) Date of Patent: Jul. 21, 2020

(54) LOW LEAKAGE CMOS SWITCH TO ISOLATE A CAPACITOR STORING AN ACCURATE REFERENCE

(71) Applicant: RENESAS ELECTRONICS AMERICA INC., Milpitas, CA (US)

(72) Inventor: Peter John Mole, St. Albans (GB)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/181,131

(22) Filed: Nov. 5, 2018

Related U.S. Application Data

(60) Provisional application No. 62/581,954, filed on Nov. 6, 2017.

(51) Int. Cl.
*H02M 1/08* (2006.01)
*H02M 3/158* (2006.01)
*G05F 1/46* (2006.01)

(52) U.S. Cl.
CPC ............. *H02M 1/08* (2013.01); *H02M 3/158* (2013.01)

(58) Field of Classification Search
CPC .......... G05F 1/462; G05F 1/465; G05F 1/468; G05F 3/08; G05F 3/16; G05F 3/30; H02M 3/156; H02M 1/08; H02M 3/158; H02M 3/1588
See application file for complete search history.

(56) References Cited

U.S. PATENT DOCUMENTS

| | | | | |
|---|---|---|---|---|
| 5,481,212 A | * | 1/1996 | Shima ................. | G11C 27/026 327/91 |
| 5,517,150 A | * | 5/1996 | Okumura ............... | H01L 27/12 257/E27.111 |
| 6,023,074 A | * | 2/2000 | Zhang ................ | G02F 1/13624 257/350 |
| 6,657,420 B1 | * | 12/2003 | Shacter ................. | G05F 1/575 323/288 |
| 6,696,884 B1 | * | 2/2004 | Seven ..................... | G05F 3/08 327/540 |
| 2002/0154253 A1 | * | 10/2002 | Cairns .............. | G02F 1/136213 349/43 |
| 2012/0313666 A1 | * | 12/2012 | Thomas ................. | G11C 27/02 327/94 |
| 2012/0313667 A1 | * | 12/2012 | Thomas ................. | G11C 27/02 327/94 |
| 2012/0313670 A1 | * | 12/2012 | Thomas ................... | G11C 7/02 327/109 |
| 2015/0035513 A1 | * | 2/2015 | Hinrichs .............. | H02M 3/156 323/313 |

* cited by examiner

*Primary Examiner* — Daniel Kessie
*Assistant Examiner* — Sisay G Tiku
(74) *Attorney, Agent, or Firm* — Foley & Lardner LLP

(57) ABSTRACT

One or more embodiments enable both a fixed bandgap reference voltage and a variable reference voltage to be generated and stored on a capacitor. According to certain aspects, the present embodiments use an additional storage capacitor of smaller size to reduce the sub-threshold leakage of an isolating FET switches at high temperatures. Among other aspects, this enables a more efficient use of chip area for reducing sub-threshold induced leakage than simply increasing the storage capacitor when precision storage is required.

5 Claims, 8 Drawing Sheets

LOW LEAKAGE CMOS SWITCH TO ISOLATE A CAPACITOR STORING AN ACCURATE REFERENCE

CROSS-REFERENCE TO RELATED APPLICATIONS

The present application claims priority to U.S. Provisional Patent Application No. 62/581,954, filed Nov. 6, 2017, the contents of which are incorporated herein by reference in their entirety.

TECHNICAL FIELD

The present embodiments relate generally to power management, and more particularly to a low leakage CMOS switch to isolate a capacitor storing an accurate reference.

BACKGROUND

DC-DC converters (e.g., buck converters, boost converters, buck-boost converters) are used in a wide variety of applications to enable the provision of a regulated amount of power to a load from an input power source. Design challenges for such devices can arise in various operating constraints, for example when power consumption requirements are very low.

SUMMARY

One or more embodiments enable both a fixed bandgap reference voltage and a variable reference voltage to be generated and stored on a capacitor. According to certain aspects, the present embodiments use an additional storage capacitor of smaller size to reduce the sub-threshold leakage of an isolating FET switches at high temperatures. Among other aspects, this enables a more efficient use of chip area for reducing sub-threshold induced leakage than simply increasing the storage capacitor when precision storage is required.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments are directed to a low power reference voltage generator. In embodiments, a storage capacitor is used to hold the desired reference voltage The reference generation circuit can then be turned off for a time which depends on how long the capacitor can keep the desired accuracy. The reference generation circuitry is periodically re-activated to charge up the capacitor. The average current consumption is reduced by the periodic activation of the generation circuitry. In embodiments, an additional smaller capacitance is included to lower the discharge rate of the storage capacitor. This causes the generation circuitry to be activated less frequently and lowers the average power consumption of the reference generation circuitry.

Figure 1:
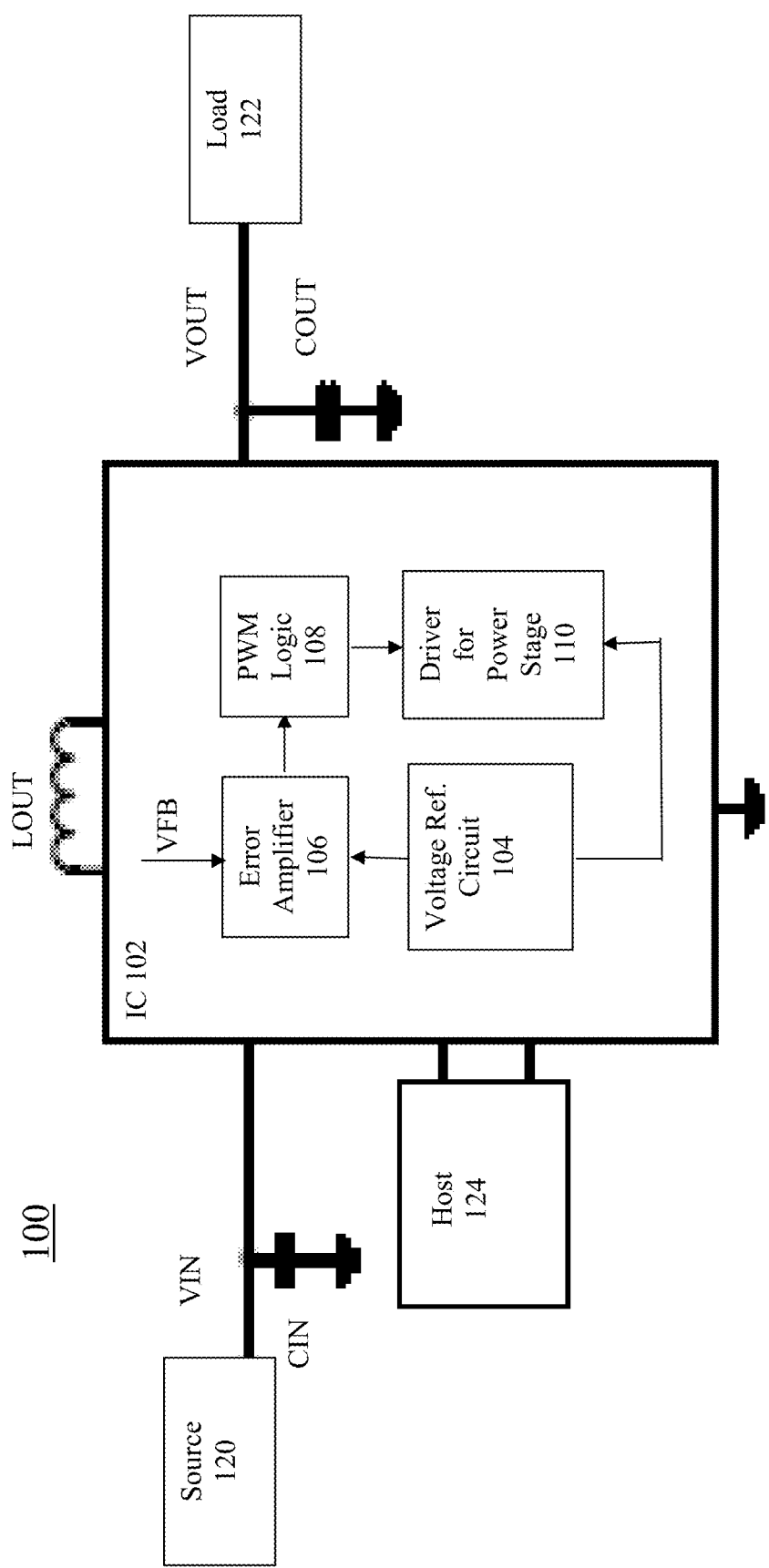
FIG. 1 is a block diagram illustrating an example system according to embodiments.

FIG. 1 illustrates an example system incorporating a DC-DC controller having a reference voltage generator according to embodiments. It should be noted, however, that the present embodiments are not limited to systems including a DC-DC controller.

As can be seen, system 100 includes a DC-DC converter integrated circuit (IC) 102. For low-power applications it uses a minimal number of external components, such as input and output capacitors CIN and COUT, and output inductor LOUT. Although not shown in FIG. 1, power FETs and a voltage feedback divider can also be commonly integrated within the single IC 102, along with digital control from a host 124 (e.g. a CPU, power management IC, etc.) over an I2C bus, for example. Digital control can additionally or alternatively be provided by means of a pinstrap or a resistor divider connected to IC 102. It should be noted that the present embodiments are not limited to this example, and the principles thereof can be extended to other applications with less, or more, integration of components in IC 102 than the example of FIG. 1.

According to certain general aspects, IC 102 is able to provide a regulated voltage to a load 122 (e.g., having an output voltage VOUT) from a power source 120 (e.g., having an input voltage VIN) via LOUT and COUT. Load 122 can be an IoT device such as a smart speaker, etc., or any other type of device having low power consumption requirements or modes or where low power consumption would be desirable. Source 120 can be a battery, a power adapter, a USB connector, etc.

To assist in providing the regulated output voltage VOUT, as further shown in FIG. 1, IC 102 includes a voltage reference circuit 104. In this example, voltage reference circuit 104 provides a reference voltage to error amplifier 106. For example, the reference voltage VREF provided to error amplifier 106 may be compared to a feedback voltage (VFB), which can be based on the output voltage VOUT. The amplified difference from error amplifier 106 can be provided to PWM logic 108, which generates a pulse width modulated signal based thereon, perhaps in combination with other inputs not shown such as a ramp signal or clock signal. The PWM signal from PWM logic 108 can then be provided to driver 110, which can be used to switch on an off power MOSFETs in a power stage either on chip in IC 102 or off chip.

As still further shown in the example of FIG. 1, voltage reference circuit can also provide a reference voltage (either the same or different voltage as provided to error amplifier 106) to driver 110. This can be used as a reference voltage for a bandgap or bias voltage.

Among other things, the present applicant recognizes that in ultra-low power applications or modes of operation (e.g. a sleep mode), the voltage reference circuit 104 can consume an unacceptable amount of power. To avoid this, the voltage reference circuit 104 can include a capacitor that is charged to the desired reference voltage and the voltage on the capacitor can be provided as the reference voltage to either or both of error amplifier 106 or driver 110. The capacitor can then be isolated from the other circuitry in circuit 104, and the voltage reference circuit 104 can then be disabled so that it consumes negligible current from the power supply. The initial state when the voltage reference circuit 104 is enabled is sometimes referred to as the 'active' phase, and the state when the circuit 104 is disabled is the 'holding' phase.

The isolated capacitor will hold the reference voltage for a time dependent on the leakage current through the isolation switch. If the time taken for the reference voltage to alter by the allowable tolerance ($\Delta V$) is N times longer than the time taken to turn the reference on and top up the charge on the capacitor, then the average current taken by the voltage reference circuit 104 is $1/(N+1)$th of the current that would be taken by the circuit 104 without the isolated holding capacitor.

Figure 2:
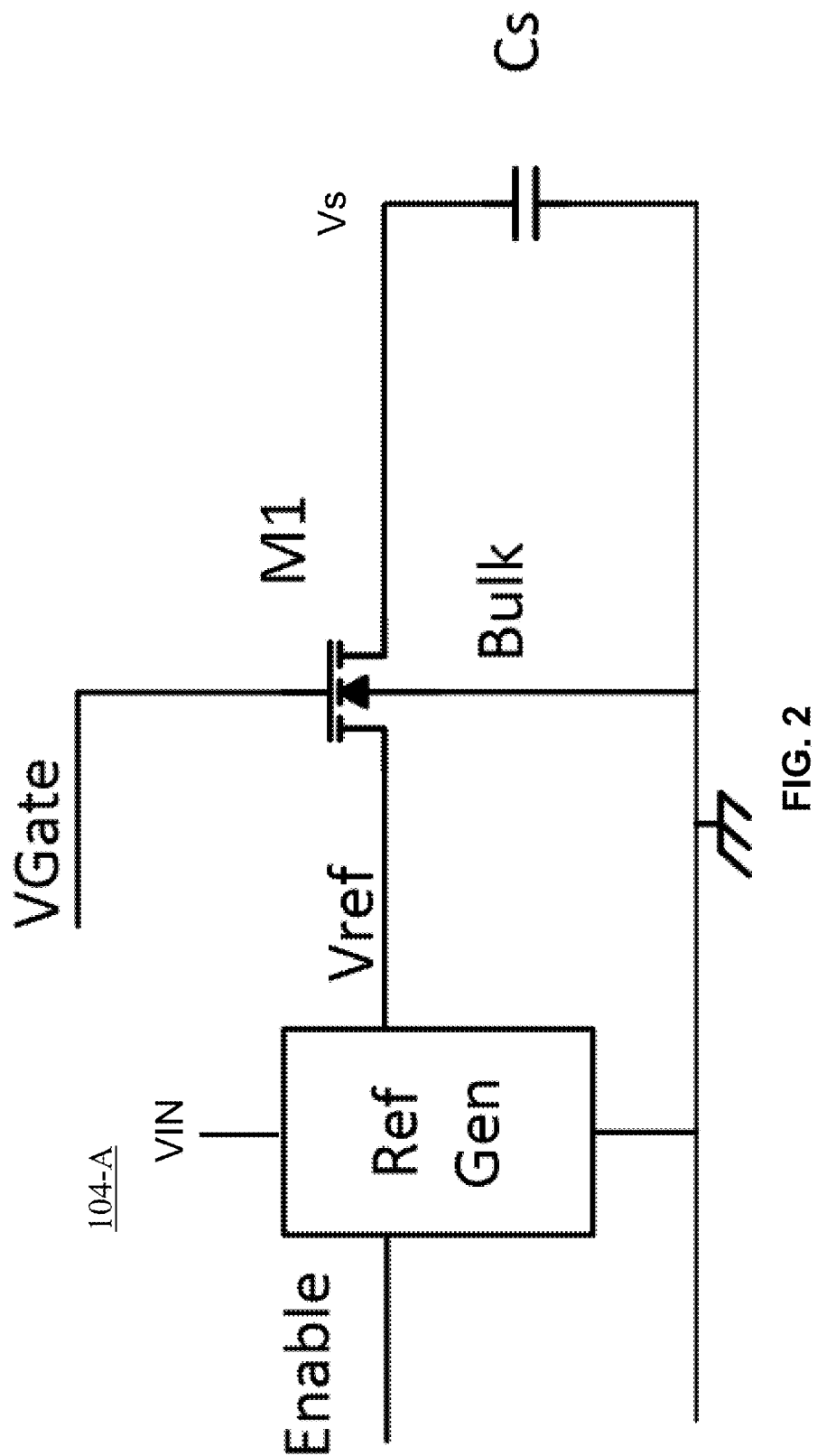
FIG. 2 is a schematic diagram illustrating an example voltage reference circuit according to embodiments.

FIG. 2 is a schematic diagram of an example voltage reference circuit 104-A according to embodiments. As shown, circuit 104-A includes an isolated reference capacitor, Cs, which is charged to the reference voltage Vref via an NMOS FET M1. The p-well of the NMOS transistor is connected to the 0V supply (e.g., ground). Typical values of this capacitor will be of the order of 10 pF. Charging occurs when Vgate is taken to a positive voltage. When the gate voltage Vgate is taken to ground potential, M1 is turned off and the isolated capacitor Cs will discharge through the FET M1 at a rate determined by the leakage currents. The leakage current of concern is the subthreshold channel conduction which is determined by how much below the lower of Vs and Vref, the gate can be taken.

Figure 3:
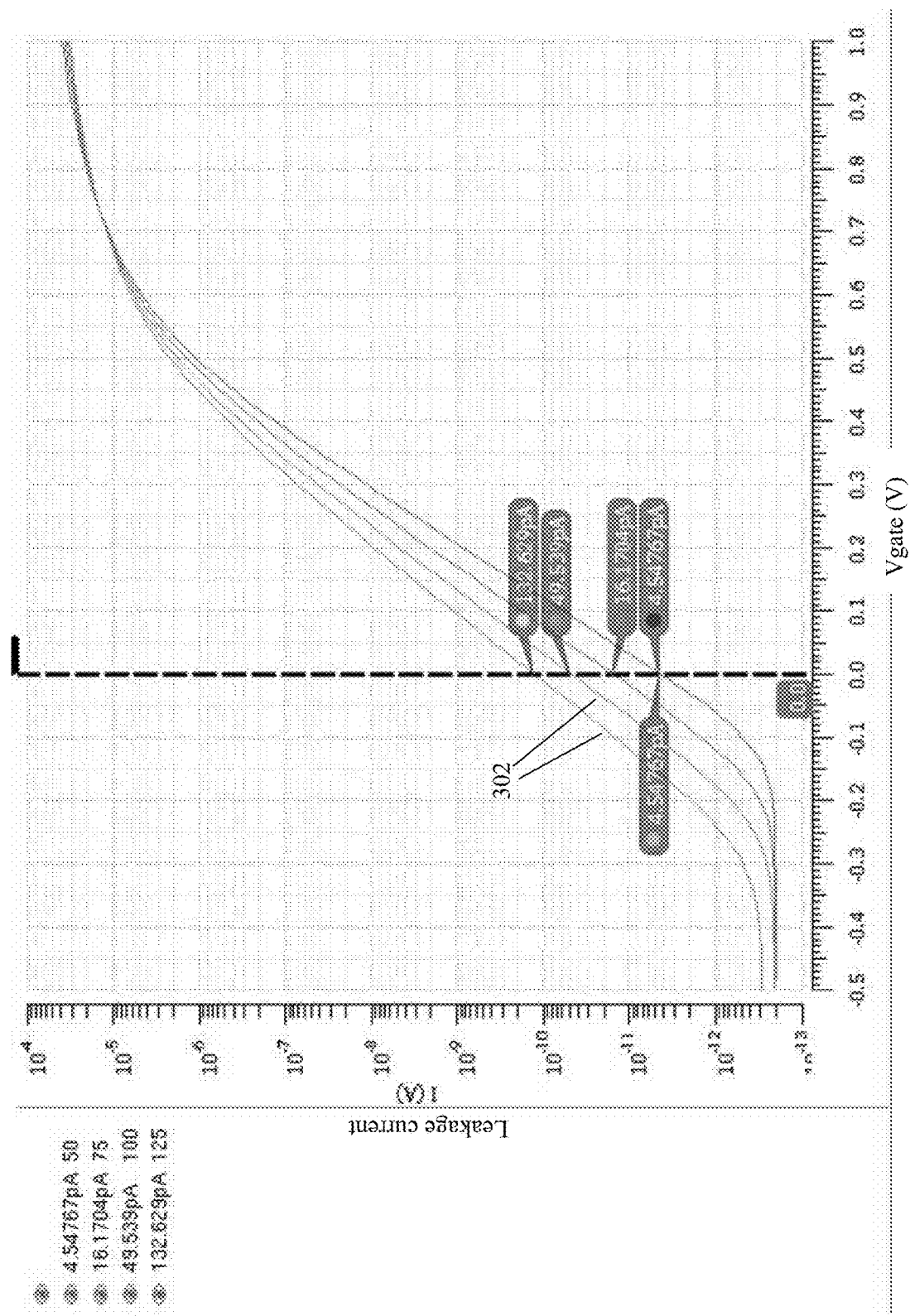
FIG. 3 is a waveform diagram illustrating the variation of leakage current when Vout is close to 0V and Vref is 100 mV.

FIG. 3 is a waveform diagram that shows the variation of leakage current when Vs is close to 0V and Vref is 100 mV above. When Vgate is 0V the leakage current is a strong function of temperature as shown by the different curves 302 for respective different temperatures (e.g., 50° C., 75° C., 100° C. and 125° C.). As shown in FIG. 3, at 100° C., typical leakage currents will be 50 pA. This will cause a 10 pF reference capacitor to shift by 5 mV in 1 ms. For reference voltages requiring about 1 mV accuracy, if the current consumption is to be reduced, the leakage current needs to be reduced so the time interval between refreshes can be increased.

One way to reduce the leakage current is to increase the capacitance of the capacitor Cs. However, the present applicant recognizes that increasing the capacitance requires increased area, which is an expensive option for a chip such as IC 102.

Figure 4:
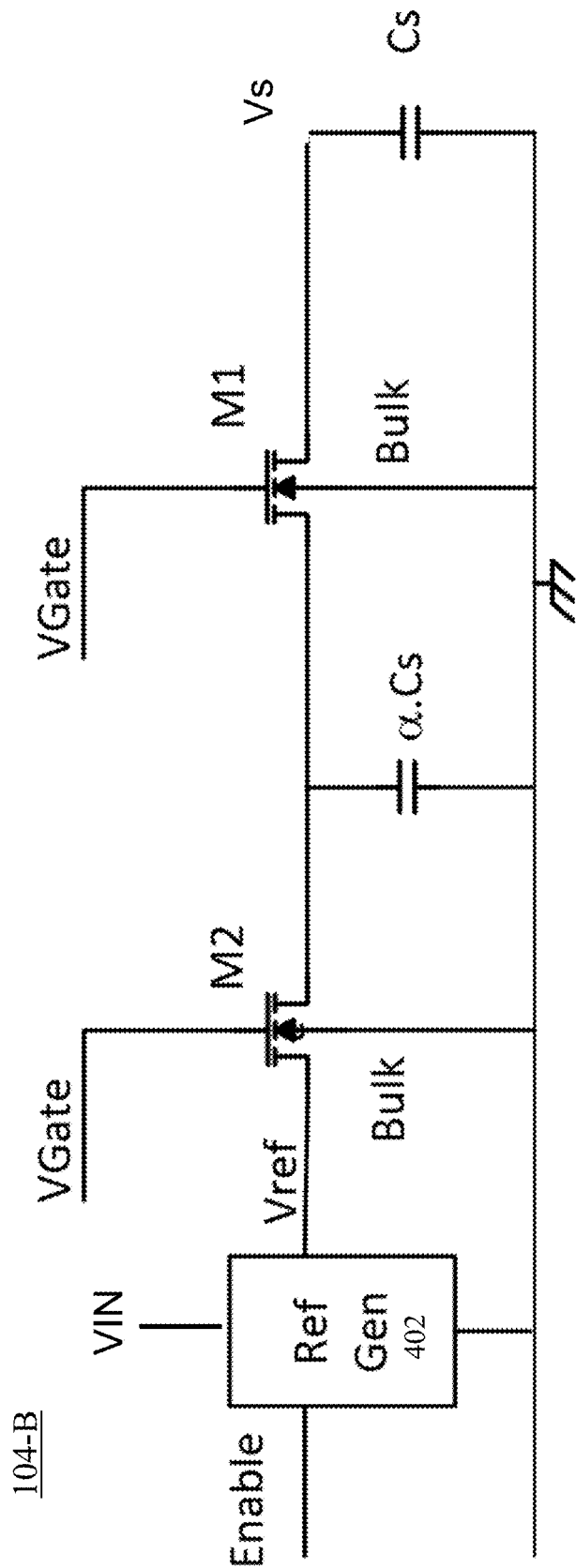
FIG. 4 is a schematic diagram illustrating another example voltage reference circuit according to embodiments.

FIG. 4 is a schematic diagram illustrating another example of circuit 104 according to embodiments, which can provide a more economical alternative to increasing the capacitance of Cs, among other aspects.

In this circuit 104-B, a second switch M2 is added between FET M1 and the reference generator 402. An additional capacitor having a capacitance value of αCs is placed where M1 connects to M2 and in parallel with Cs. During operation of 104-B, to maintain the desired reference voltage on Vs, an enable signal is periodically provided to reference generator 402 (e.g. by a host 124 over an I2C bus), and concurrently the Vgate signals are driven high (e.g. by switches connected to Vdd and operated by the enable signal). While the enable signal is provided, reference generator 402 drives the voltage Vref to the desired voltage, and the high Vgate signals cause M1 and M2 to conduct. The relative amount of time the enable signal is provided (i.e. the duty cycle of the enable signal) and the frequency at which the enable signal is provided (i.e. the switching frequency of the enable signal) can be determined based on the accuracy desired and the particular components of circuit 104-B by those skilled in the art. Moreover, reference generator 402 can also be implemented in many ways known to those skilled in the art and so further details thereof will be omitted here for sake of clarity of the embodiments.

Figure 5:
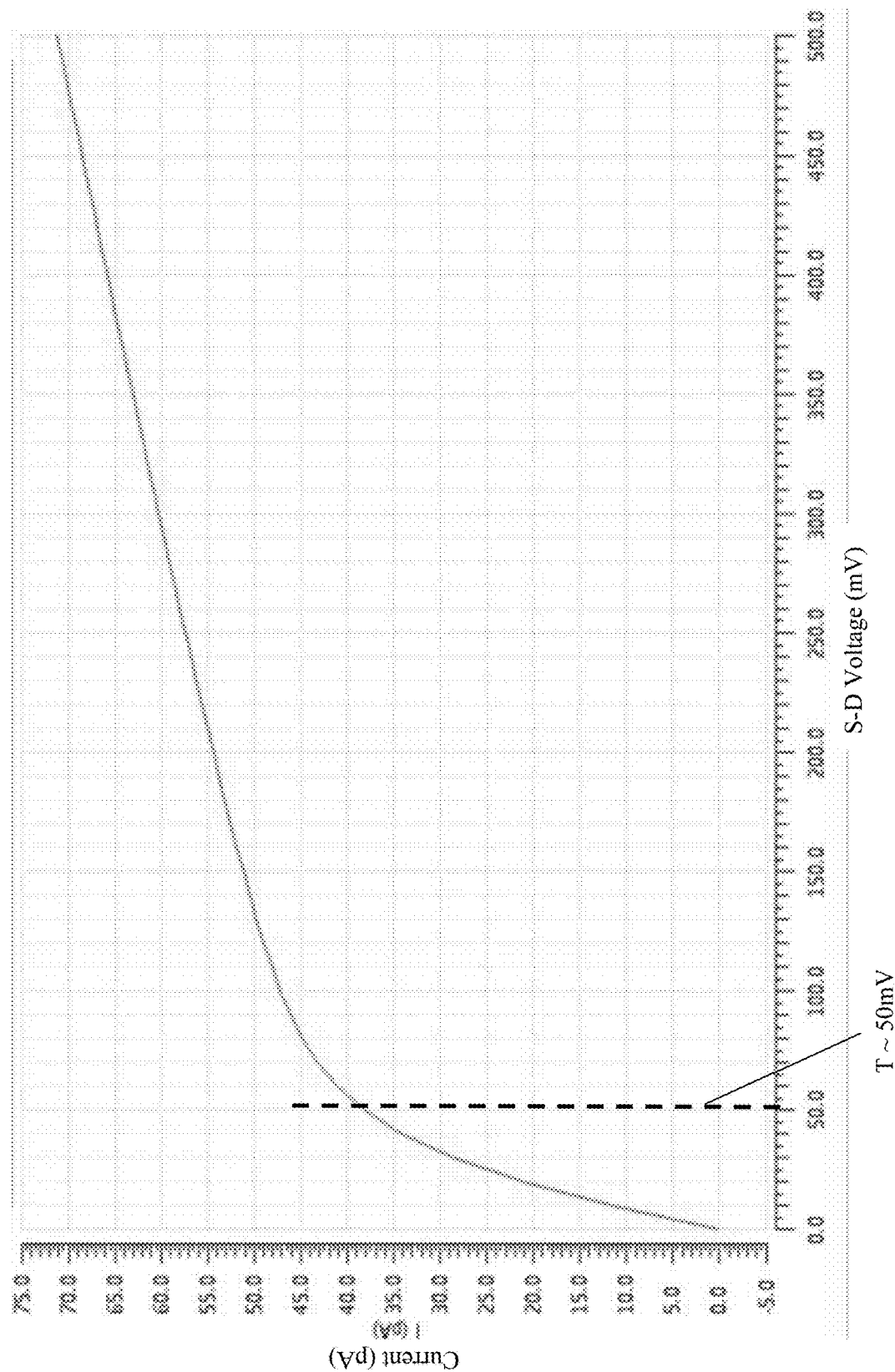
FIG. 5 is a waveform diagram illustrating current versus S-D voltage in an example FET according to embodiments.

The modification of the circuit 104-A in FIG. 2 with the additional capacitor shown in FIG. 4 has the following effect. When Vgate is taken high, both capacitors are charged to Vref. When Vgate is taken low, the source and drain of M1 are initially at the same potential so no channel leakage flows and the output capacitor Cs initially maintains its voltage. The FET M2 will leak and the capacitor αCs will charge. As it charges, a voltage will appear across M1 and this will initiate a leakage current to alter the charge on Cs. However, the dependence of the leakage current in M1 as a function of its S-D voltage is shown in the example of FIG. 5. More particularly, the curve 502 in FIG. 5 shows that while the S-D voltage of M1 remains below a threshold T of about 50 mV, the current falls off sharply as a function of lower S-D voltage compared to the more slowly varying current at higher S-D voltages. So if α is chosen in this example so as to keep the S-D voltage below 50 mV during the holding phase, a valuable reduction in the leakage current that discharges Cs in FIG. 2 can be obtained for a small increase in total area of capacitance.

Figure 6:
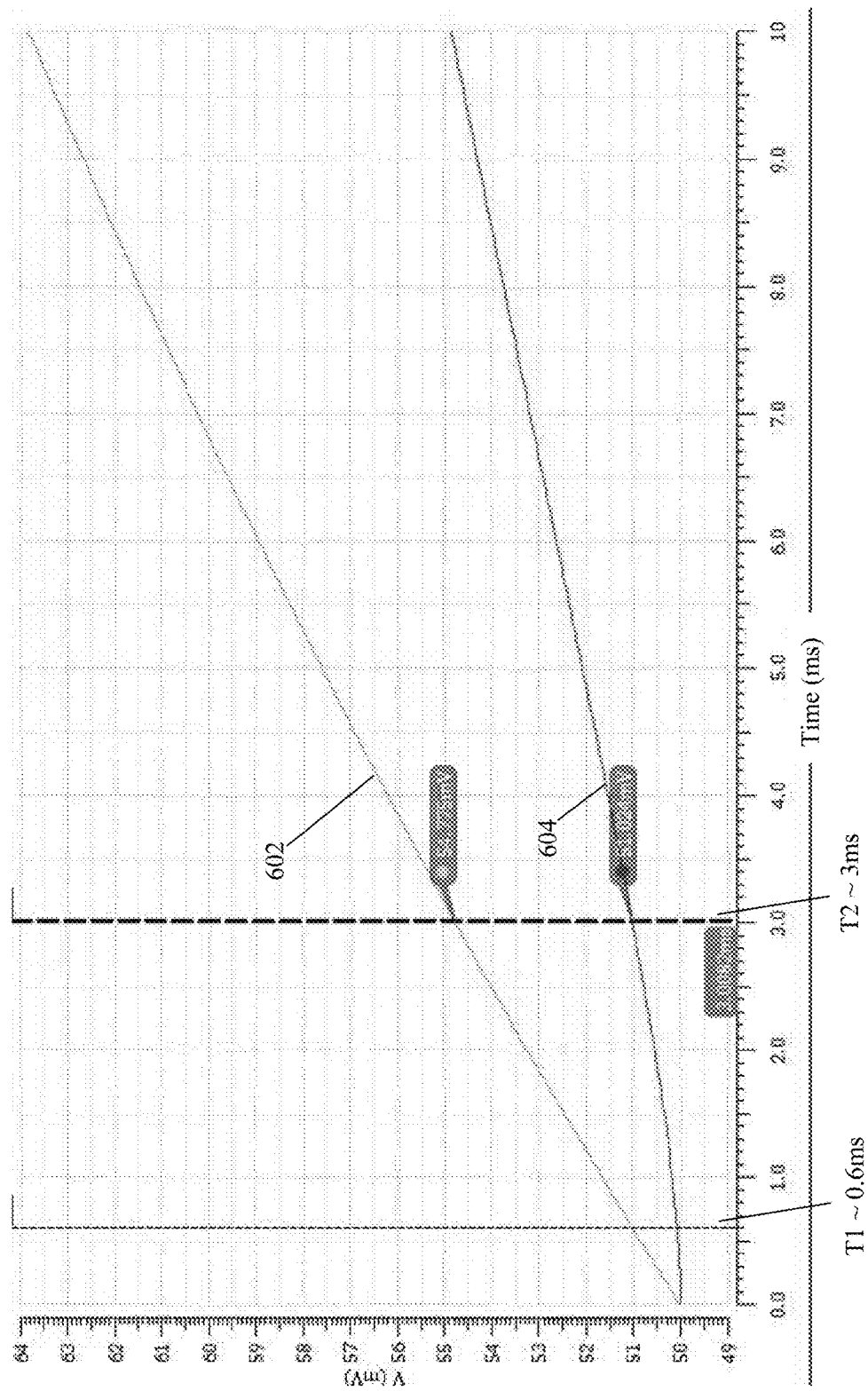
FIG. 6 is a waveform diagram illustrating example aspects of the circuit shown in FIG. 4.

More particularly, the waveform diagram of FIG. 6 shows the effect of this embodiment. This illustrates a simulation in which the capacitors Cs and αCs are initially charged to 50 mV. The gate voltages of M1 and M2 are then turned to 0V and Vref is increased to 0.6V, so as to induce a leakage current. Thus, current flows in M2 and tries to pull the additional capacitor αCs towards 0.6V (i.e. to rise above 50 mV). The slow rise of the voltage on αCs causes the current to increase to the storage capacitor Cs, but the voltage across M1 is small, so the output change is slow. Curve 602 shows how the voltage Vs changes in the original circuit (without the additional capacitor)—starting from 50 mV it reaches 51 mV after 0.6 ms at 100° C. With the modification described in connection with FIG. 4, the voltage again starts at 50 mV, but it has only drifted by 1 mV after about 3 ms giving a five-fold improvement in hold time with the value of α at 0.1. This represents a significant advantage in area compared to increasing the output capacitance six times to give the same hold time.

Figure 7:
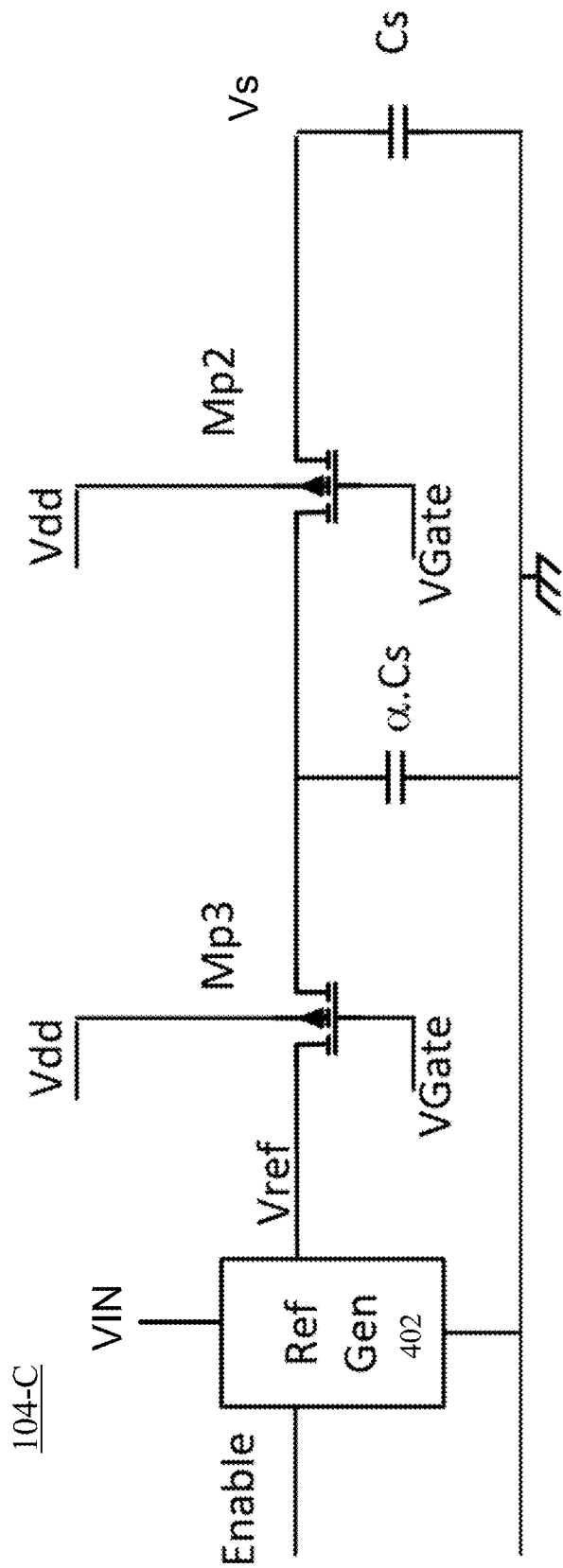
FIG. 7 is a schematic diagram illustrating another example voltage reference circuit according to embodiments.

For cases where the reference voltage is close to the supply voltage, NMOS transistors cannot be used. The same concept can be implemented using PMOS transistors as shown in the example circuit 104-C in FIG. 7. In this case the PMOS device is connected to the positive supply (e.g., Vdd). The gate is taken to the positive supply to turn the device off, and when the reference voltage is close to this supply voltage, subthreshold channel conduction will be the main source of leakage as for the NMOS case.

Figure 8:
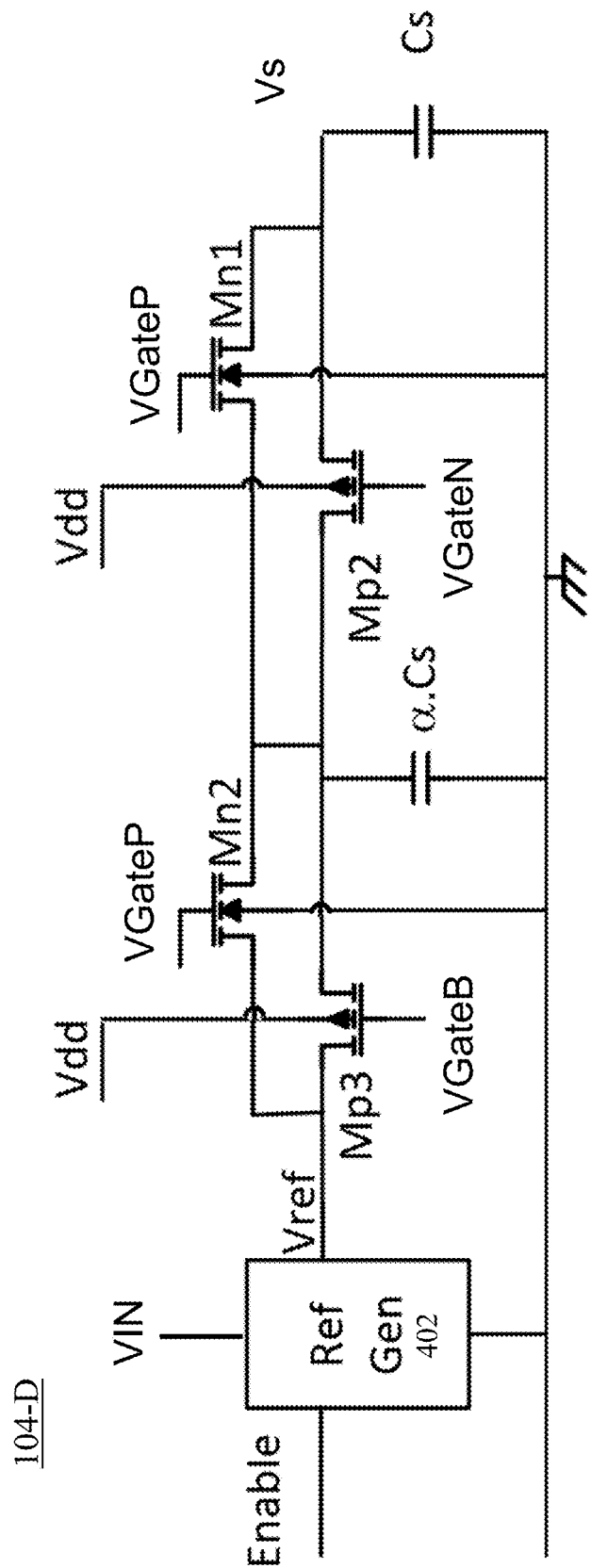
FIG. 8 is a schematic diagram illustrating another example voltage reference circuit according to embodiments.

In the case where the reference supply can vary and may be close to either the positive supply or ground, then a complementary version of the concept can be implemented. In this case both NMOS and PMOS devices are connected in parallel, with the p-wells of the NMOS connected to 0V supply and the n-wells of the PMOS devices connected to the positive supply Vdd. An example of this circuit 104-D is illustrated in FIG. 8. In the complementary case, VGateN is taken to 0V in the hold phase and to Vdd in the active phase, whilst VGateP is taken to Vdd in the hold phase and 0V in the active phase.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A circuit comprising:
   a reference generator that generates a reference voltage in response to an enable signal;
   a reference capacitor that is charged with the reference voltage during an active phase;
   an additional capacitor that is also charged with the reference voltage during the active phase in parallel with the reference capacitor, the additional capacitor having a lower capacitance value than the reference capacitor, the lower capacitance value being selected to cause the reference capacitor to maintain an accuracy during a duration of a holding phase;
   a first n-type isolating switch connected between the reference capacitor and the additional capacitor and a second n-type isolating switch connected between the additional capacitor and the reference generator; and
   a first p-type isolating switch connected between the reference capacitor and the additional capacitor and a second p-type isolating switch connected between the additional capacitor and the reference generator.

2. The circuit of claim 1, wherein the first and second n-type isolating switches are configured to be turned off during the holding phase and turned on during the active phase while the first and second p-type isolating switches are both turned off during the holding phase and active phase.

3. The circuit of claim 1, wherein the first and second p-type isolating switches are configured to be turned off during the holding phase and turned on during the active phase while the first and second n-type isolating switches are both turned off during the holding phase and active phase.

4. The circuit of claim 1, wherein the first and second n-type isolating switches are comprised of FETs.

5. The circuit of claim 1, wherein the first and second p-type isolating switches are comprised of FETs.

* * * * *